United States Patent
Fischer et al.

(10) Patent No.: US 7,540,477 B2
(45) Date of Patent: Jun. 2, 2009

(54) TRAY VALVE FOR A TRAY COLUMN

(75) Inventors: Markus Fischer, Constance (DE);
Ireneusz Bobrowski, Poznan (PL);
Vincenzo Curti, Latina (IT); Emil Fehr,
Berg am Irchel (CH)

(73) Assignee: Sulzer Chemtech AG, Winterthur (CH)

( * ) Notice: Subject to any disclaimer, the term of this patent is extended or adjusted under 35 U.S.C. 154(b) by 540 days.

(21) Appl. No.: 11/495,407

(22) Filed: Jul. 27, 2006

(65) Prior Publication Data

US 2007/0023938 A1    Feb. 1, 2007

(30) Foreign Application Priority Data

Jul. 29, 2005    (EP)   ................... 05405459

(51) Int. Cl.
*B01F 3/04*      (2006.01)
(52) U.S. Cl. .................................. 261/114.4
(58) Field of Classification Search ............... 261/113, 261/114.2, 114.3, 114.4, 114.5
See application file for complete search history.

(56) References Cited

U.S. PATENT DOCUMENTS

| | | | | |
|---|---|---|---|---|
| 3,215,414 A | * | 11/1965 | Van't Sant | 261/114.4 |
| 3,287,004 A | * | 11/1966 | Nutter | 261/114.4 |
| 3,696,832 A | * | 10/1972 | Maurice et al. | 137/512.1 |
| 3,770,255 A | * | 11/1973 | Nutter | 261/114.4 |
| 3,815,880 A | * | 6/1974 | Price | 261/114.4 |
| 4,344,900 A | | 8/1982 | Sonnekecker | 261/114 |
| 5,911,922 A | * | 6/1999 | Hauser et al. | 261/114.4 |
| 6,053,485 A | * | 4/2000 | Pan et al. | 261/114.4 |
| 6,193,222 B1 | * | 2/2001 | Fan | 261/114.3 |
| 6,270,062 B1 | * | 8/2001 | Chuang et al. | 261/114.4 |
| 6,422,539 B1 | * | 7/2002 | Burton et al. | 261/114.4 |
| 2002/0163091 A1 | | 11/2002 | Wu | 261/114.4 |

FOREIGN PATENT DOCUMENTS

FR      1361579      4/1964
GB      1018924      2/1966

\* cited by examiner

*Primary Examiner*—Scott Bushey
(74) *Attorney, Agent, or Firm*—Francis C. Hand; Carella, Byrne, Bain etal

(57) ABSTRACT

The tray valve for a tray column includes an opening in a tray for a vapor passage and a valve body that is made to match the tray opening. The valve body consists of a top plate and vertically downwardly directed guide limbs arranged at the edge of the plate. The guide limbs have barbs for the anchoring of the valve body in the opening. The material and shape of the valve body are selected so that upon insertion of the valve body into the tray opening the top plate deforms in an arched manner while the guide limbs and barbs without deformation pass through the opening in a snap-fit manner. Weakened portions, in the form of grooves, slits or bores, can be provided in the top plate to facilitate upward arching of the top plate. Any deformation at the inserted valve body can be reversed, with the exception of a slight residual deformation, by an application of force onto the top plate.

18 Claims, 4 Drawing Sheets

Fig. 3
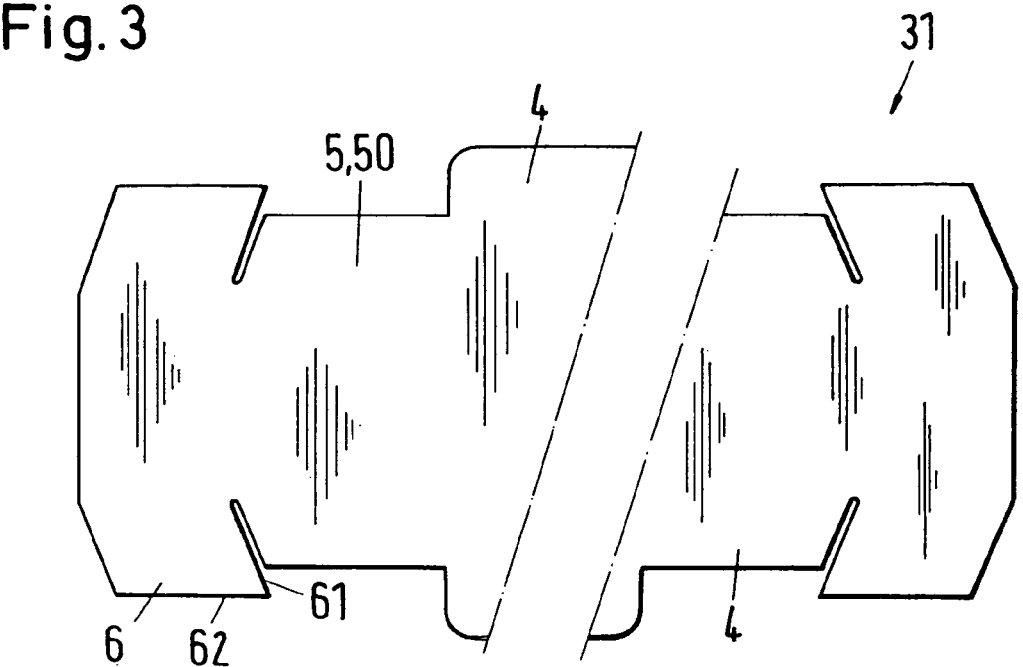
Fig. 4
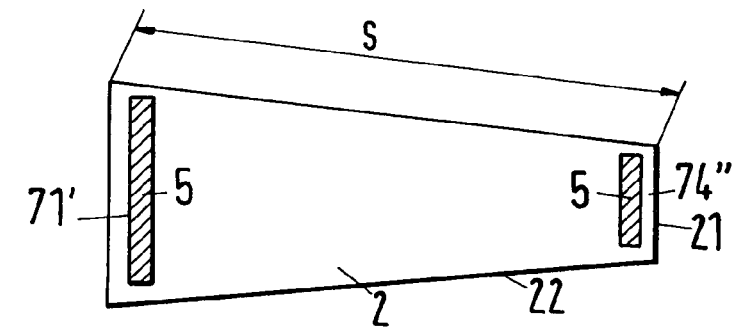
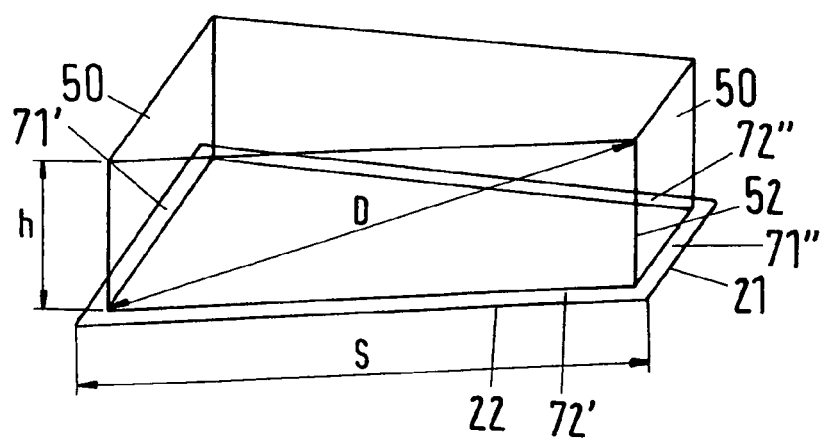

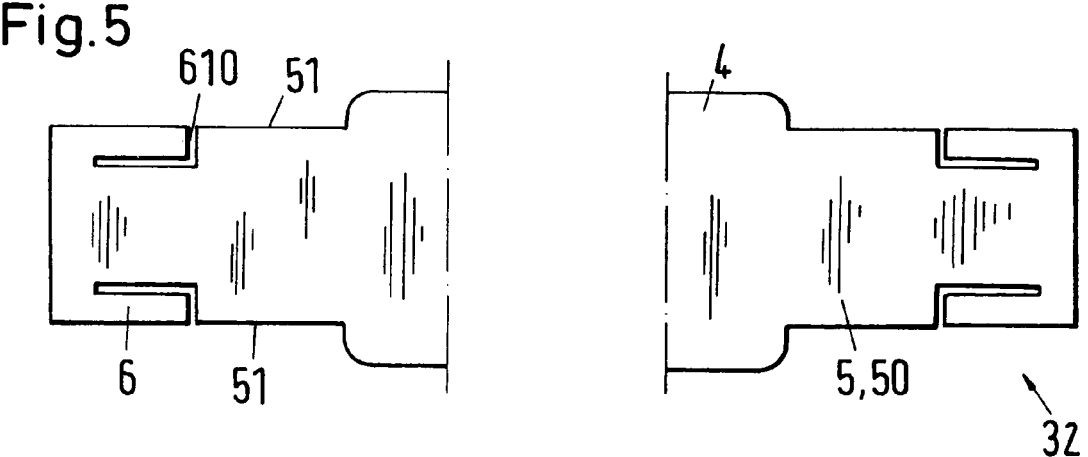
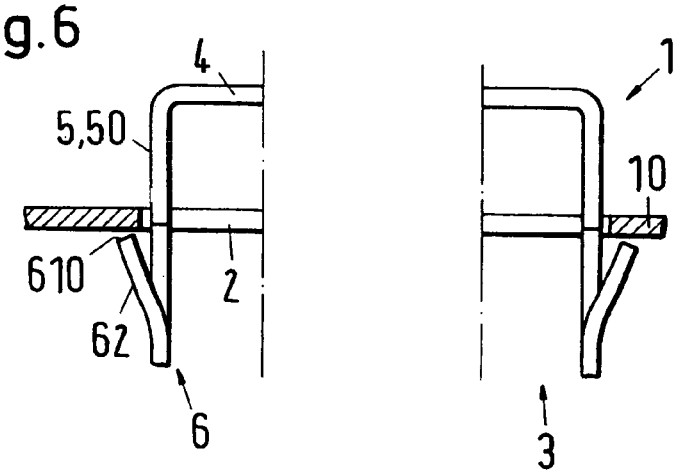
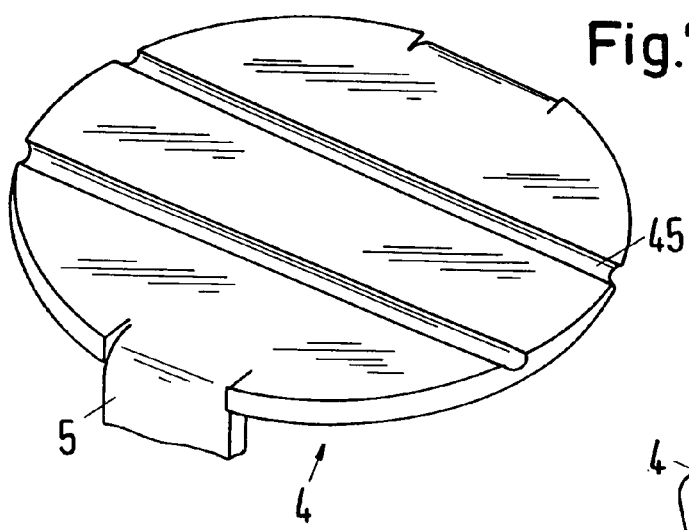
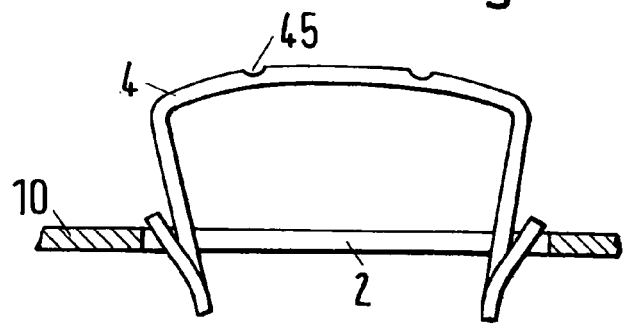

TRAY VALVE FOR A TRAY COLUMN

This invention relates to a tray valve for a tray column. More particularly, this invention relates to a method for the insertion of a valve body into a tray opening.

As is known, tray columns operate so that a gaseous phase (vapor) is brought into contact with a liquid phase on trays within the tray column. In many cases, the trays are provided with a multiplicity of valves through which an ascending vapor may pass. Typically, these tray valves employ an opening in the tray and valve body in the opening that is movable to permit a variable vapor passage through the opening.

A tray valve for a circular tray opening is known from GB-A-1,018,924. The valve body of this tray valve includes a plurality of guide limbs which are attached to the edge of a circular top plate and are perpendicular to the plate. Barbs for the anchoring of the valve body are arranged on the guide limbs. The valve body can be inserted into the tray opening by hand with the guide limbs and/or barbs being resiliently deformed. Depending on the material, a plastic deformation of the limbs and/or barbs can occur which has to be reversed with an additional operation after the insertion of the valve body.

A disadvantage of this valve design resides in the fact that the guide limbs are easy to deform. As a result, the guide limbs become strained mechanically during the operation of the column such that the tray valves can lose their valve bodies due to a deformation of the guide limbs.

A tray valve with two guide limbs is known from U.S. Pat. No. 3,770,255. The guide limbs are attached diametrically opposite one another to two parallel sides of a trapezium-shaped top plate. The trapezium approximately has the shape of an elongate rectangle at whose short sides the guide limbs are arranged. The guide limbs merge at their lower ends into angled, outwardly directed surfaces which are parallel to the top plate and serve as barbs. The insertion of the valve body requires an operation in which the guide limbs are bent inwardly using an instrument so that the barbs can be introduced into the tray opening. In this operation, plastic deformations occur at the guide limbs and/or barbs which have to be at least partly reversed again with an additional operation after insertion.

The insertion operation takes place in a similar manner with a widespread round valve with three guide limbs. Examples of further tray valves are shown e.g. in H. Z. Kister, "Distillation Design", McGraw-Hill, Inc. 1992, pages 253 ff.

Accordingly, it is the object of the invention to provide a tray valve with a valve body that can be easily inserted in an opening of a tray.

It is another object of the invention to provide a tray valve with a valve body that can be easily inserted in an opening of a tray without deformation of the guide limbs of the valve body.

It is another object of the invention to reduce the possibility of a valve body of a tray valve becoming lost during operation of a tray column.

Briefly, the invention provides a tray valve for a tray column comprised of an opening in a tray for the passage of an ascending flow of vapor and a valve body for fitting into the opening. The valve body includes a top plate for disposition over the opening, vertically downwardly directed guide limbs that extend from an edge of the top plate for passage through the opening, and at least one barb extending from each limb to engage an underside of the tray.

In accordance with the invention, the material and shape for the valve body are selected with respect to its insertion into the tray opening such that a resilient deformation, and optionally a partly plastic deformation, of the valve body results upon insertion which is largely restricted to the top plate in the form of an upward arching. Any deformation at the inserted valve body can be reversed at the inserted valve body, with the exception of a slight residual deformation, by an application of force onto the top plate. The valve body is made of a one piece sheet metal and is made of a material selected from the group consisting of unalloyed steel, alloyed steel, stainless steel, light metal, high-resistance metal and alloys, plastics, ceramic, carbon and fiber reinforced composite materials, and carbon fiber reinforced composite materials. Typically, the top plate has a thickness in the range from 0.5 to 3 mm for an opening in the tray that defines an area in a range of from 500 to 2000 mm$^2$.

The top plate may also have weakened portions to facilitate deformation of the top plate in an upwardly arched manner relative to the guide limbs in response to insertion of the guide limbs into the opening in a snap-fit manner.

The barbs that are used on the guide limbs have a horizontally disposed upper edge for engaging the underside of the tray and an inclined side surface extending downwardly from the upper edge and inwardly of the valve body. Alternatively, the barbs may have an inclined upper edge engaging the underside of the tray and an inclined side surface extending downwardly from the upper edge and inwardly of the valve body.

Each guide limb is formed with a pair of vertical side edges and each barb of a respective guide limb is disposed between these side edges.

These and other objects and advantages of the invention will become more apparent from the following detailed description taken in conjunction with the accompanying drawings wherein:

FIG. 3 illustrates a plan view of a shaped piece of sheet metal from which the valve body of FIG. 1 can be manufactured by shaping;

FIG. 4 illustrates the geometrical relationships between the valve body and the tray opening;

FIG. 5 illustrates a view of a shaped piece of sheet metal for forming a second embodiment of a valve body in accordance with the invention;

FIG. 6 illustrates a longitudinal section through a tray valve in accordance with the second embodiment;

FIG. 7 illustrates a valve body employing a circular top plate with respect to a third embodiment according to the invention;

FIG. 8 illustrates a view of a valve body of FIG. 7 during insertion into a tray opening in accordance with the invention.

Figure 1:
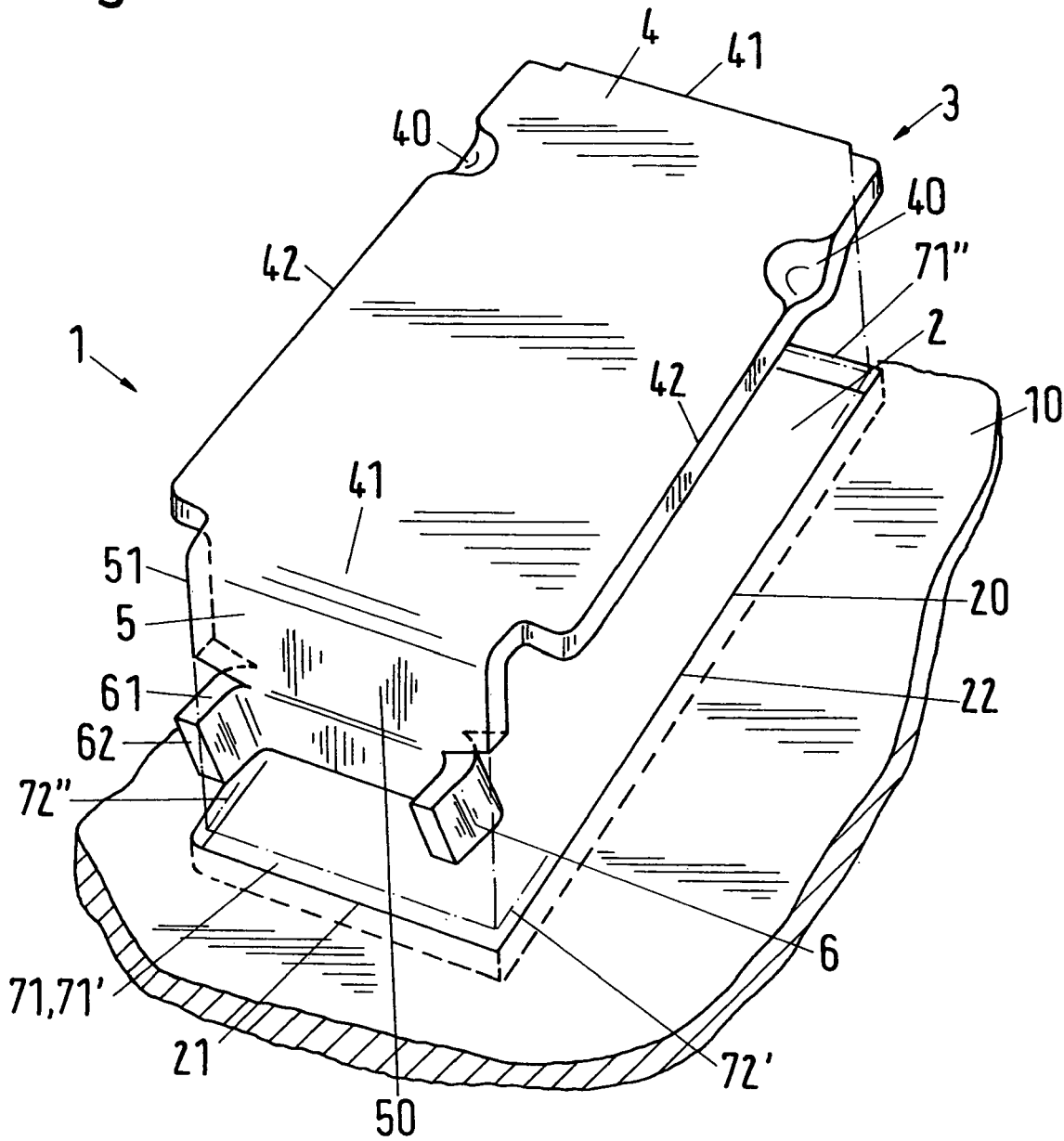
FIG. 1 illustrates a perspective view of a valve body of the tray valve in accordance with the invention and a corresponding tray opening for a vapor passage through a tray.
Figure 2:
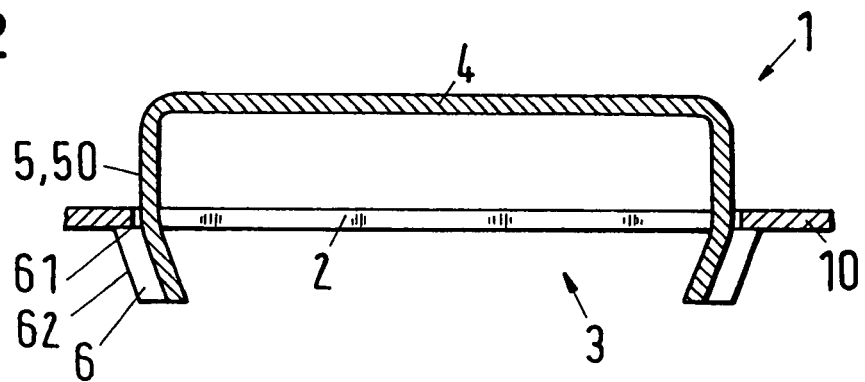
FIG. 2 illustrates a longitudinal section through the tray valve of FIG. 1 with an inserted valve body.

Referring to FIGS. 1 and 2, the tray valve 1 is formed of an opening 2 in a tray 10 of otherwise conventional structure and a valve body 3. The opening 2 provides for the passage of an ascending flow of vapor and the valve body 3 permits a variable vapor flow through the tray opening 2.

The valve body 3 is made to match a rim 20 of the opening 2 and includes a top plate 4 and two guide limbs 5 which are arranged at the edge of this plate 4 and are directed vertically downwardly. The rim 20 of the opening 2 has a rectangular shape with two short sides 21 and two long sides 22. The top plate 4 correspondingly has four straight edge sides 41 and 42 which lie on a rectangle, with the short sides 41 being bent edges and the long sides 42 coming to rest outside the rim 20 of the opening 2 above the tray 10.

The guide limbs 5 have barbs 6 with which the valve body 3 can be anchored to the rim 20 of the opening so that the upward stroke of the valve body 3 during use is limited so that valve body 3 cannot be raised out of the tray opening 2 with a maximum vapor passage.

The top plate 4 has dimple-like, downwardly directed elevation portions 40 ("dimples") at the long edge sides 42 to ensure that the tray valve 1 always allows a minimal vapor passage. With the exception of the dimples, the plate edge lies on a plane which will be termed the plate plane in the following. Instead of dimples 40 at the top plate 4, corresponding upwardly directed dimples are also possible in the tray 10 at the rim 20 of the opening.

The outer surfaces of the guide limbs 5 each contain a stroke region 50 which is perpendicular to the plate plane. The barbs 6 are arranged at the two guide limbs 5 standing diametrically opposite to one another.

In accordance with the invention, the valve body 3 is made of a material and a shape that allows for a resilient deformation, and optionally a partly plastic deformation, that is largely restricted to the top plate 4 during insertion into the opening 2. The deformation is visible as an upward arching that occurs in response to a maximum bending stress due to the cooperation of the bending moment and the resistance moment—as a result of the force effects required for the insertion of the valve body 3. That is to say, during insertion into the opening, the top plate 4 of the valve body 3 is caused to arch upwardly while the guide limbs 5 remain unstressed and are pivoted inwardly an amount sufficient to pass through the opening 2. At completion of the insertion step, the top plate 4 resiliently recovers towards its original flat condition while the guide limbs 5 are pivoted outwardly an amount sufficient to allow the barbs 6 to engage the tray 2 under the rim 20 of the opening 2.

If a plastic deformation is present in the top plate 4 after the insertion, with the exception of a small residual deformation, it can be reversed by the exertion of a force effect onto the top plate 4. The eccentrically positioned dimples 40 also permit a temporary bending over in the opposite direction so that the originally provided shape is achievable practically without traces of a residual deformation.

Weakened portions, for example in the form of grooves, slits or bores, can be provided in the top plate 4 which reduce the resistance moment locally and facilitate a forming of the upward arching (cf. FIG. 7).

As a rule, the spacing of the guide limbs 5 is relatively large in comparison with their vertical lengths so that the deformation of the valve body 3 is largely restricted to the top plate 4. The guide limbs 5 and the barbs 6 remain practically undeformed on insertion.

Each barb 6 is made in the manner of a tab and has a planar upper side surface 61 (or only a straight upper edge 610, see FIG. 6) which lies parallel to the plate plane. The barb 6 also has an outer side surface 62 with a projecting inclination. The spacing to a central axis directed perpendicular to the plate plane (not shown) decreases for this side surface 62—starting at the upper edge 610 and continuing downwardly. Due to the upper side surface 61 (or the upper edge 610), no variable slanting position of the valve body 3 results on the maximum vapor passage through the tray valve 1; the stroke region 50 is thus clearly upwardly bounded, i.e. limited. Consequently, the maximum value of the vapor passage can be reproduced from valve to valve due to the special design of the barbs 6.

Tray valves with barbs are known from the prior art in which a curved surface for the stroke bounding does not permit such reproducibility.

Referring to FIG. 3, the valve body 3 can be made from a one piece sheet metal 31 by shaping. The top plate 4, the guide limbs 5 and the barbs 6 form parts of the one piece of sheet metal 31. (The guide limbs 5 and/or the barbs 6 could also be manufactured as separate parts which were joined together to the valve body 3). The shaping of the sheet metal 31 takes place by a stamping or a cutting and also includes a plastic shaping, in particular a bending or punching of the piece of sheet metal.

The rim 20 of the opening 2 is quadrangular or, for example, also circular. The top plate 4 has corresponding rims which lie on a quadrangle or circle and project over the rim 20 of the opening. The quadrangles are preferably rectangles, see FIG. 1 or trapeziums, see FIG. 4, with approximately the shape of rectangles. FIG. 4 shows a representation for the explanation of the geometric relationships between the valve body 3 and the tray opening 2. The trapezium shape is drawn in a somewhat exaggerated manner with a relatively pronounced deviation from the rectangular shape. A plan view of the tray opening 2 with cross-sectioned guide limbs 5 is shown at the top in FIG. 4. The bottom of FIG. 4 shows an oblique image with the geometric situation of the valve body 3 in the region which is formed by the stroke regions 50 with the edges 51.

The guide limbs 5 are aligned parallel to one another and to the short quadrangle sides 21. Gaps 71', 71" are provided between the guide limbs 5 and the short rims 21 of the opening. The valve body cannot seize at the rim 20 of the opening by a wedging canting due to these gaps 71', 71". If the one guide limb 5 contacts the rim 21 of the opening at the gap 71", the other gap 71' has its maximum opening: gap 71. What is illustrated with reference to FIG. 4 applies with respect to this maximum gap 71. Vertical edges 51 of the guide limbs 5 span two rectangles over a height h of the stroke regions 50 and perpendicular thereto whose largest diagonal D is shorter than the length S of the corresponding edge side 22. (In FIG. 4, all diagonals are equally long; equal to D). The difference between the length S and the diagonal D has a value which is larger than 0.3 mm. This difference preferably amounts to around 1 mm. Gaps 72', 72" are likewise provided at the long rims 22 of the opening and are each approximately 0.25 to 1.5 mm large, preferably 0.5 mm.

The thickness of the top plate 4 or of the piece of sheet metal 31 has a value in the range from 0.5 to 3 mm. The area of the opening 2 for the vapor passage has a value in the range from 500 to 2000 mm$^2$. The length of the barb 6 has a value in the range from 2 to 10 mm. The height h of the stroke range is larger than 5 and smaller than 20 mm and preferably has a value in the range from 7 to 15 mm.

Referring to FIGS. 5 and 6, wherein like reference characters indicate like parts as above, the valve body may be made of a shaped piece of sheet metal 32 wherein the guide limbs 5 each bear one barb 6 each at the vertical edges 51, the barb having an upper edge 610 parallel to the plate plane and an outer side surface 62 with a projecting inclination.

The guide limbs 5 can each also have only one barb 6. A barb of this type is advantageously arranged in the middle between the edges 51 and is made relatively wide (not shown).

Several types of material can be used to produce the valve body 3, namely the following material types: unalloyed steel (carbon steel), low alloyed and alloyed steels, in particular stainless steels (ferritic and austenic) or special steels (e.g. duplex, supra), light metals (e.g. titanium, aluminium), high-resistance metals and alloys (e.g. with zirconium, tantalum, copper, zinc; in particular the nickel-based alloy monel), plastics (e.g. polypropylene PP, PVDF), ceramic material as well as carbon and fibre reinforced composite materials, in particular carbon fibre reinforced composite materials. Whether the top plate 4 deforms resiliently or plastically depends on the choice of the material.

Tray columns include a respective plurality of tray valves 1 in accordance with the invention on their trays 10. The tray valves 1 can be inserted relatively easily into these columns: a respective first guide limb 5 is advantageously introduced into the opening 2 provided for the vapor passage. The second guide limb 5 is set onto the rim 20 of the opening 2 with the inclined outer side surfaces 62 of the barb 6. The barbs 6 are forced to make a pivot movement into the inner region of the opening 2 and the top plate 4 is forced to form an upward arching by application of a force onto the top plate 4, for example by means of a force impact by means of a blow above the second guide limb 5, such that the second guide limb 5 and its two barbs 6 penetrate into the opening 2 while carrying out a snap-in movement. The same also applies correspondingly when the guide limb 5 only bears one barb 6. The valve body 3 can also be inserted by setting on the barbs 6 of both guide limbs 5 at both sides (cf. FIG. 8) and by exertion of a subsequent force blow. A larger force is required in this process than with a setting on at one side.

With a suitably made pressing device, the valve bodies 3 can be inserted simultaneously in each case with a group of adjacent tray valves 1, with this also being able to take place without exertion of a force impact, that is e.g. via a uniform stroke movement.

A plastic deformation occurring on the upward arching of the top plate 4 in the form of an upwardly convex arch can be reversed at least partly without a special tool having to be used with which the valve body 3 can be acted on from the lower side of the tray. A simple tool is sufficient with which a force acting on a middle region of the top plate can be exerted over the tray. Since the upward arching means an enlarging of the passage opening for the vapor flow, a small upward arching has a favorable effect and can therefore also be left.

FIG. 7, wherein like reference characters indicate like parts as above, shows a valve body with a top plate 4 that is circular with grooves 45 provided in the surface in parallel with the guide limbs 5. These grooves 45 facilitate the deformation of the top plate 4 which is necessary on the insertion into the tray opening 2. This is illustrated in FIG. 8 in which the upward arching is shown by means of kink points at the grooves 45. Instead of the grooves 45, slits or rows of small-calibre bores can also be provided. The groove 45 can be replaced by one slit or by a plurality of slits.

Figure 9:
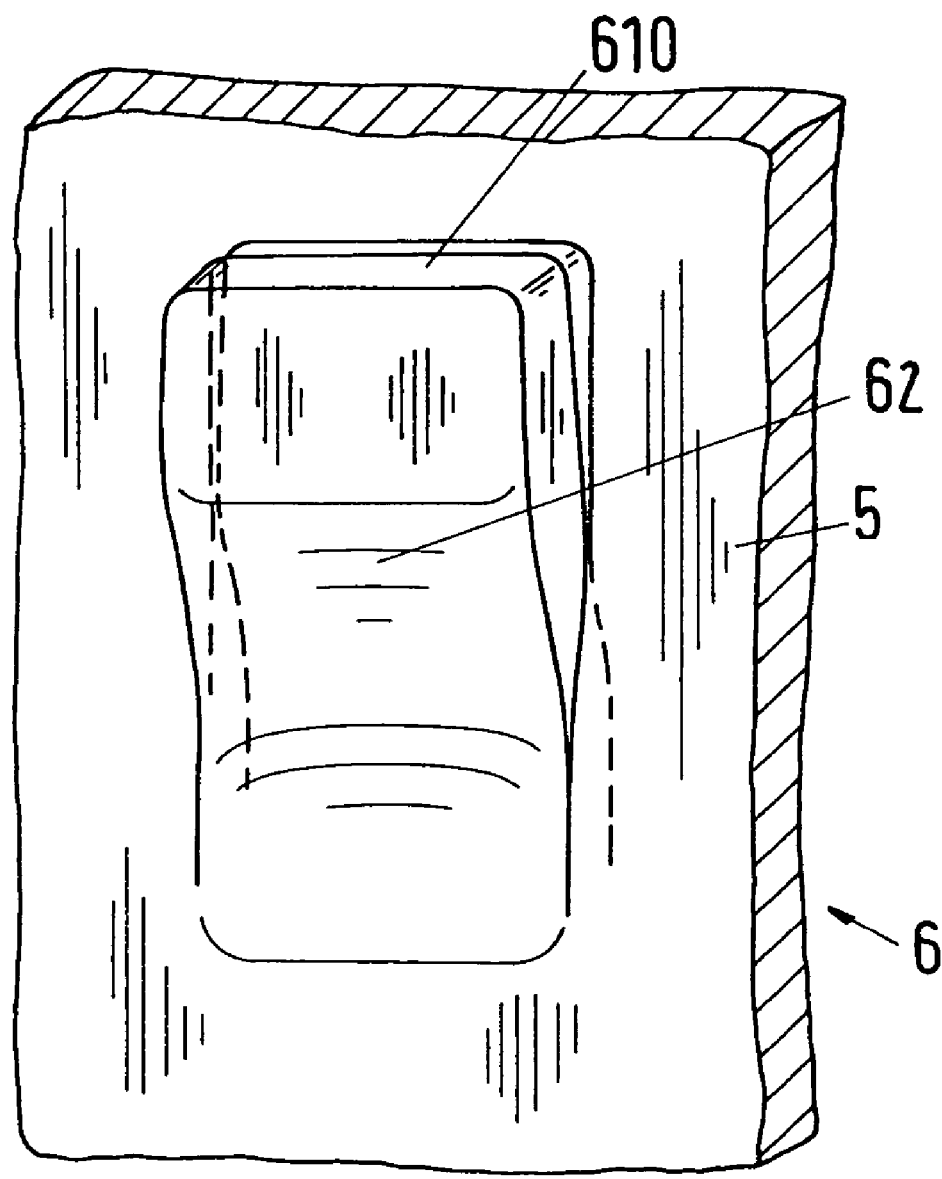
FIG. 9 illustrates a section of a guide limb with a barb generated by stamping and shaping in accordance with the invention.

The barbs 6 can also be generated by a stamping and shaping (in one work step). The barb 6 shown in FIG. 9 has an upper edge 610 generated by stamping and an outer side shaped by punching with a middle part 62 with a projecting inclination. The barbs 6 of FIGS. 5 and 6 can be replaced by barbs 6 in accordance with FIG. 9. Only one such barb 6 can also be provided in the middle of the guide limb 5, with it advantageously extending over a large region of the guide limb width.

The invention thus provides a tray valve for a column that has a valve body with guide limbs that are not strained mechanically during the operation of the column. Further, the invention provides a valve body with guide limbs that can be inserted into a opening in a tray without deformation of the guide limbs. Still further, the invention reduces the risk that the tray valves of a tray column can lose their valve bodies due to a deformation of the guide limbs.

What is claimed is:

1. A tray valve for a tray column comprising
a tray having an opening therein for the passage of a vapor; and
a valve body including a top plate for disposition over said opening in said tray, vertically downwardly directed guide limbs extending from an edge of said plate for passage through said opening, and at least one barb extending from each said limb to engage an underside of said tray; said top plate having weakened portions therein to facilitate deformation of said top plate in an upwardly arched manner relative to said guide limbs in response to insertion of said guide limbs into said opening in a snap-fit manner.

2. A tray valve as set forth in claim 1 wherein said weakened portions include at least one of a groove, a slit and a bore.

3. A tray valve as set forth in claim 1 wherein said weakened portions include a plurality of grooves extending across said top plate in parallel relation to said guide limbs.

4. A tray valve as set forth in claim 1 wherein said barb has a horizontally disposed upper edge engaging the underside of said tray and an inclined side surface extending downwardly from said upper edge and inwardly of said valve body.

5. A tray valve as set forth in claim 1 wherein said barb has an inclined upper edge engaging the underside of said tray and an inclined side surface extending downwardly from said upper edge and inwardly of said valve body.

6. A tray valve as set forth in claim 1 wherein each said guide limb has a pair of vertical side edges and each said barb of a respective guide limb is disposed between said side edges.

7. A tray valve as set forth in claim 1 wherein said opening is of quadrangular shape with two long sides and two short sides and wherein said guide limbs of said valve body are parallel to each other and to said short sides, and wherein said guide limbs are spaced from each said long sides and said short sides of said opening to define gaps therebetween.

8. A tray valve as set forth in claim 7 wherein each said guide limb has a pair of vertical side edges of a predetermined height (h) and wherein a distance (D) between a lowestmost point of one of said vertical side edges of one of said barbs and a highestmost point of an oppositely disposed vertical side edge of an oppositely disposed barb is less than the length (S) of said long side of said opening by a value larger than 0.3 mm.

9. A tray valve as set forth in claim 1 wherein said valve body is made of a one piece sheet metal.

10. A tray valve as set forth in claim 1 wherein said valve body is made of a material selected from the group consisting of unalloyed steel, alloyed steel, stainless steel, light metal, high-resistance metal and alloys, plastics, ceramic, carbon and fiber reinforced composite materials, and carbon fiber reinforced composite materials.

11. A tray valve as set forth in claim 1 wherein said top plate has a thickness in the range from 0.5 to 3 mm; said opening defines an area in a range of from 500 to 2000 mm$^2$; and each said barb has a length in a range of from 2 to 10 mm and a height larger than 5 mm and smaller than 20 mm.

12. A valve body for a tray column comprising
a top plate for disposition over an opening in a tray,
a pair of vertically downwardly directed guide limbs extending from an edge of said plate for passage through the opening,
at least one barb extending from each said limb to engage an underside of the tray, and
weakened portions in said top plate to facilitate deformation of said top plate in an upwardly arched manner relative to said guide limbs in response to insertion of said guide limbs into the opening of the tray in a snap-fit manner.

13. A tray valve as set forth in claim 12 wherein said weakened portions include a plurality of grooves extending across said top plate in parallel relation to said guide limbs.

14. A tray valve as set forth in claim 12 wherein said valve body is made of a one piece sheet metal.

15. A method of installing a valve body in an aperture of a tray comprising the steps of providing a tray with at least one opening for the passage of vapor;

obtaining a valve body having a top plate for disposition over said opening in said tray, a pair of vertically downwardly directed guide limbs extending from an edge of said plate for passage through said opening, and at least one barb extending from each said limb to engage an underside of said tray; said top plate having weakened portions therein;

introducing one of said guide limbs into said opening; and thereafter applying a force onto said top plate above the other of said guide limbs sufficient to deform said top plate in an upwardly arched manner relative to said guide limbs and to pivot said barbs into an interior of said opening while causing said other of said guide limbs and said barb thereon to penetrate into said opening while carrying out a snap-in movement.

16. A method of installing a valve body in an aperture of a tray comprising the steps of providing a tray with at least one opening for the passage of vapor;

obtaining a valve body having a top plate for disposition over said opening in said tray, a pair of vertically downwardly directed guide limbs extending from an edge of said plate for passage through said opening, and at least one barb extending from each said limb to engage an underside of said tray; said top plate having weakened portions therein;

positioning said valve body over said opening with said guide limbs perpendicular to said tray; and thereafter pressing said valve body into said opening under a force sufficient to cause said top plate to deform in an upwardly arched manner relative to said guide limbs while inserting said guide limbs into the opening of said tray in a snap-fit manner.

17. A method as set forth in claim 16 wherein a plurality of said valve bodies are simultaneously pressed into a respective plurality of said openings in said tray.

18. A method as set forth in claim 16 further comprising the step of thereafter applying a force on a middle region of said top plate to reduce any upwardly convex arch in said top plate.

* * * * *